(12) United States Patent
Ichikawa

(10) Patent No.: US 7,441,479 B2
(45) Date of Patent: Oct. 28, 2008

(54) STEERING WHEEL TILT DEVICE

(75) Inventor: Yasuaki Ichikawa, Tokyo (JP)

(73) Assignee: Works Bell Inc., Tokyo (JP)

( * ) Notice: Subject to any disclaimer, the term of this patent is extended or adjusted under 35 U.S.C. 154(b) by 302 days.

(21) Appl. No.: 11/471,379

(22) Filed: Jun. 20, 2006

(65) Prior Publication Data
US 2007/0290494 A1 Dec. 20, 2007

(30) Foreign Application Priority Data
Feb. 9, 2006 (JP) ............... 2006-032420

(51) Int. Cl.
*G05G 1/10* (2006.01)
(52) U.S. Cl. ............... 74/556; 74/555; 280/775
(58) Field of Classification Search ............ 280/775, 280/771, 779; 74/552, 55, 556, 529
See application file for complete search history.

(56) References Cited

U.S. PATENT DOCUMENTS 1,457,722 A * 6/1923 Busby ............... 70/209
1,459,040 A * 6/1923 Vincent ............... 74/556
3,395,930 A * 8/1968 Morgan ............... 280/775
4,495,833 A * 1/1985 Fourrey et al. ............... 74/493
5,259,264 A * 11/1993 Bodin et al. ............... 74/493
5,419,215 A * 5/1995 Herron et al. ............... 74/493
5,507,521 A * 4/1996 Steffens, Jr. ............... 280/775
6,189,405 B1 * 2/2001 Yazane ............... 74/493

FOREIGN PATENT DOCUMENTS

JP 2000-272524 10/2000
JP 2002-178933 6/2002

* cited by examiner

*Primary Examiner*—Eric Culbreth
*Assistant Examiner*—Nicole Verley
(74) *Attorney, Agent, or Firm*—Frost Brown Todd LLC

(57) ABSTRACT

Desired is a function of tilting up a steering wheel to allow a driver to get on or off easily. An object of the invention is to strengthen the coupling between a steering wheel and a steering boss and reduce the degree of backlash by using a ball and a ball receiving dent to couple the steering wheel to the steering boss and increasing the pressure applied to the ball, and to provide smooth coupling between the steering wheel and the steering boss by holding the ball from inside as a coupling member tending to protrude from a tapered hole and smoothly guiding the ball into a recess for coupling.

4 Claims, 12 Drawing Sheets

TILTED STATE

FITTED STATE

TILTED STATE

CROSS-SECTION A-A"

REGION B ON ENLARGED SCALE

CROSS-SECTION D-D"

CROSS-SECTION F-F"

CROSS-SECTION E-E"

STEERING WHEEL TILT DEVICE

BACKGROUND OF THE INVENTION

I. Field of the Invention

The present invention relates to a steering wheel tilt device having a function of tilting up a steering wheel to allow a driver to get on or off easily.

II. Description of the Related Art

Up to now, a steering wheel of a vehicle is fixed, and a lower portion of the steering wheel interferes with a leg of a driver when the driver gets on or off. Thus, the driver finds it difficult to get on or off. In order to solve this problem, therefore, there have been adopted a method of tilting up an entire steering including a steering shaft (see JP 2000-272524 A) and a method of tilting up only the steering wheel.

However, according to the method of moving the entire steering including the steering shaft, a corresponding mechanism needs to be provided already in the initial phase of manufacture. Thus, this method is not applicable to vehicles unequipped with such a mechanism, for example, sports utility vehicles and the like.

According to the current method of tilting up only the steering wheel, two components, which are provided on a steering wheel side and a steering boss side respectively as a basic structure, are coupled together by a spring-loaded pawl or the like. These components include a hinge shape as a combination of a projecting portion and a depressed portion. A certain difference in dimension is set between the projecting portion, which can be inserted into the depressed portion, and the depressed portion to ensure smoothness in mounting/removing operations. Thus, the occurrence of backlash results from a radial load in steering the steering wheel when the two components are coupled together.

In addition, it is also possible to adopt a construction in which a steering wheel is removably mounted (see JP 2002-178933 A). This construction also serves to eliminate interference of the steering wheel when a driver gets on or off. However, after having removed the steering wheel and got off, the driver must bother to carry the steering wheel about or mount it again.

In the foregoing construction in which the steering wheel is removably mounted, it is also conceivable to simply provide a socket and a plug with a rotational shaft for making a hinge movement to tilt up the steering wheel. In this construction, however, when a force for holding a ball is increased to suppress backlash, a large force is required to disconnect the steering wheel, which makes opening/closing movements thereof difficult. When the force for holding the ball is reduced to facilitate the opening/closing movements, backlash is caused.

SUMMARY OF THE INVENTION

The present invention has been made in view of the foregoing circumstances, and it is therefore an object of the invention to strengthen the coupling between a steering wheel and a steering boss and reduce the degree of backlash by using a ball and a ball receiving dent to couple the steering wheel to the steering boss and increasing the pressure applied to the ball, and to provide smooth coupling between the steering wheel and the steering boss by holding the ball from inside as a coupling member tending to protrude from a tapered hole and smoothly guiding the ball into a recess for coupling in coupling the steering wheel to the steering boss.

To attain the above-mentioned object, according to the first aspect of the present application is characterized in a steering wheel tilt device including:

a socket having a back face to which one of a steering wheel and a steering boss is mounted;

a plug having a back face to which the other of the steering wheel and the steering boss is mounted, for being fitted to the socket;

a first rotational shaft for pivoting the socket at one end thereof and the plug at one end thereof to realize a fitted state or a released state of the socket and the plug;

a second rotational shaft extending parallel to the first rotational shaft in a vicinity of an inside of the first rotational shaft on the socket side;

a sleeve arm having one end pivoted on the second rotational shaft and the other end located in a direction perpendicular to the second rotational shaft, for realizing the fitted state or the released state of the socket and the plug through a rotational movement of the other end;

a plate-type projection member with a predetermined thickness, which projects in such a direction as to face the plug and is provided on the socket such that one face thereof is in contact with the sleeve arm and parallel thereto;

a projection member provided on the plug side in contact with the other face side of the plate-type projection member in the fitted state of the socket and the plug;

a tapered hole for movably accommodating a ball from the one face side of the plate-type projection member to the other face side thereof, the tapered hole being composed of a large-diameter hole located on the one face side and having a larger diameter than the ball and a small-diameter hole located on the other face side and having a smaller diameter than the ball;

a first spring member provided between the sleeve arm and the socket, for pressing the ball toward the small-diameter hole to prevent the part of the sleeve arm from protruding from the large-diameter hole when the one end of the sleeve arm has been rotationally moved toward the plug to realize the fitted state of the socket and the plug; and a recess provided on the projection member side, for receiving a part of the ball protruding from the small-diameter hole, in which the ball is held fixed at three points, namely, by a part of the recess, a part of the tapered hole, and a part of the sleeve arm.

According to a first aspect of the present invention, the socket and the plug can make a hinge movement due to the existence of the first rotational shaft. Thus, the steering wheel can be tilted up, so the driver is allowed to get on or off easily. According to the present invention, a force is applied from the first spring member to the sleeve arm perpendicularly toward the plug in fitting the socket to the plug, so a larger force can be applied to the ball as the coupling member than in the case of conventional products. When the socket and the plug are fitted to each other, a part of the sleeve arm presses the ball due to the force of the first spring member. Owing to this pressure, the ball is pressed by a part of the recess of the plug and a part of the tapered hole. As a result, three-point fixation with a large force can be realized. Thus, secure coupling is achieved, and backlash can be suppressed.

According to an other aspect of the present invention, the ball is prevented from protruding from the small-diameter hole due to the recess for accommodating part of the ball. Therefore, when the socket and the plug are fitted to each other through a rotational movement, the ball does not interfere with the projection member of the plug. Consequently, smooth coupling is made possible.

According to a still other aspect of the present invention, after the projection member of the plug has come into contact with an inner cam, the inner cam is pushed up to stop the ball from being held by the inner cam. The ball, which can now move toward the inner cam, is thrust out of the tapered hole due to a pressure applied from the sleeve arm. Thus, the sleeve arm rotates toward the plug and the ball is prevented from being thrust out toward the small-diameter hole until the inner cam is pushed up. Therefore, the ball to which a pressing force is applied from the sleeve arm need not be thrust out toward the large-diameter hole during rotation, and rotation for fitting the socket to the plug is made possible with a small force. When the inner cam is pushed up, the ball receiving dent of the projecting portion appears subsequently to the inner cam. Therefore, the protruding ball smoothly enters the ball receiving dent. As a result, secure coupling can be achieved without a large force.

According to a still other aspect of the present invention, a dead pin is in a dead pin hole arranged in the projection member in fitting the socket to the plug. Therefore, the sleeve arm cannot be rotated in releasing the socket from the plug, unless the safety trigger is pulled to remove the dead pin from the dead pin hole. Thus, the sleeve arm is prevented from rotating unexpectedly to release the socket from the plug. Consequently, the steering wheel can be operated safely.

DETAILED DESCRIPTION OF THE PREFERRED EMBODIMENTS

Embodiments of a steering wheel tilt device according to the present invention will be described in detail with reference to the drawings.

First Embodiment

Figure 1A:
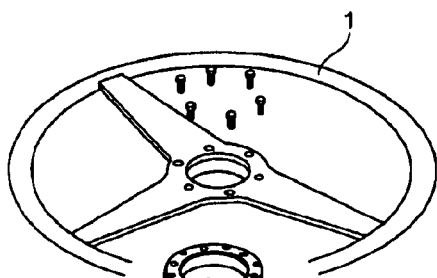
FIGS. 1A to 1C show modes of use of a steering wheel tilt device according to the present invention, consisting of FIG. 1A as an exploded perspective view of the steering wheel tilt device, FIG. 1B as a perspective view showing a fitted state of the steering wheel tilt device, and FIG. 1C as a perspective view showing a tilted state of the steering wheel tilt device.
Figure 1B:
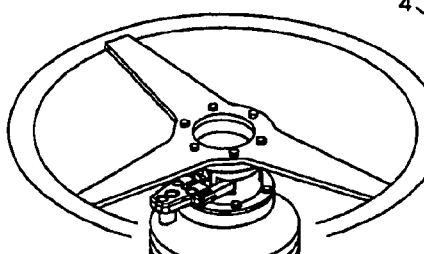
Figure 1C:
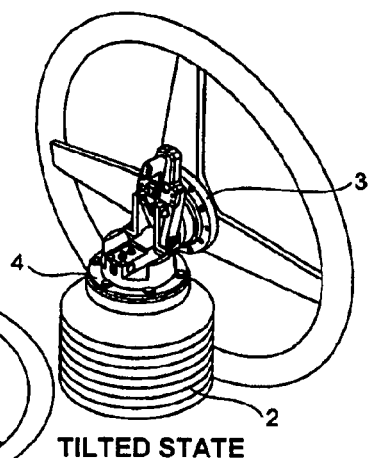
Figure 2:
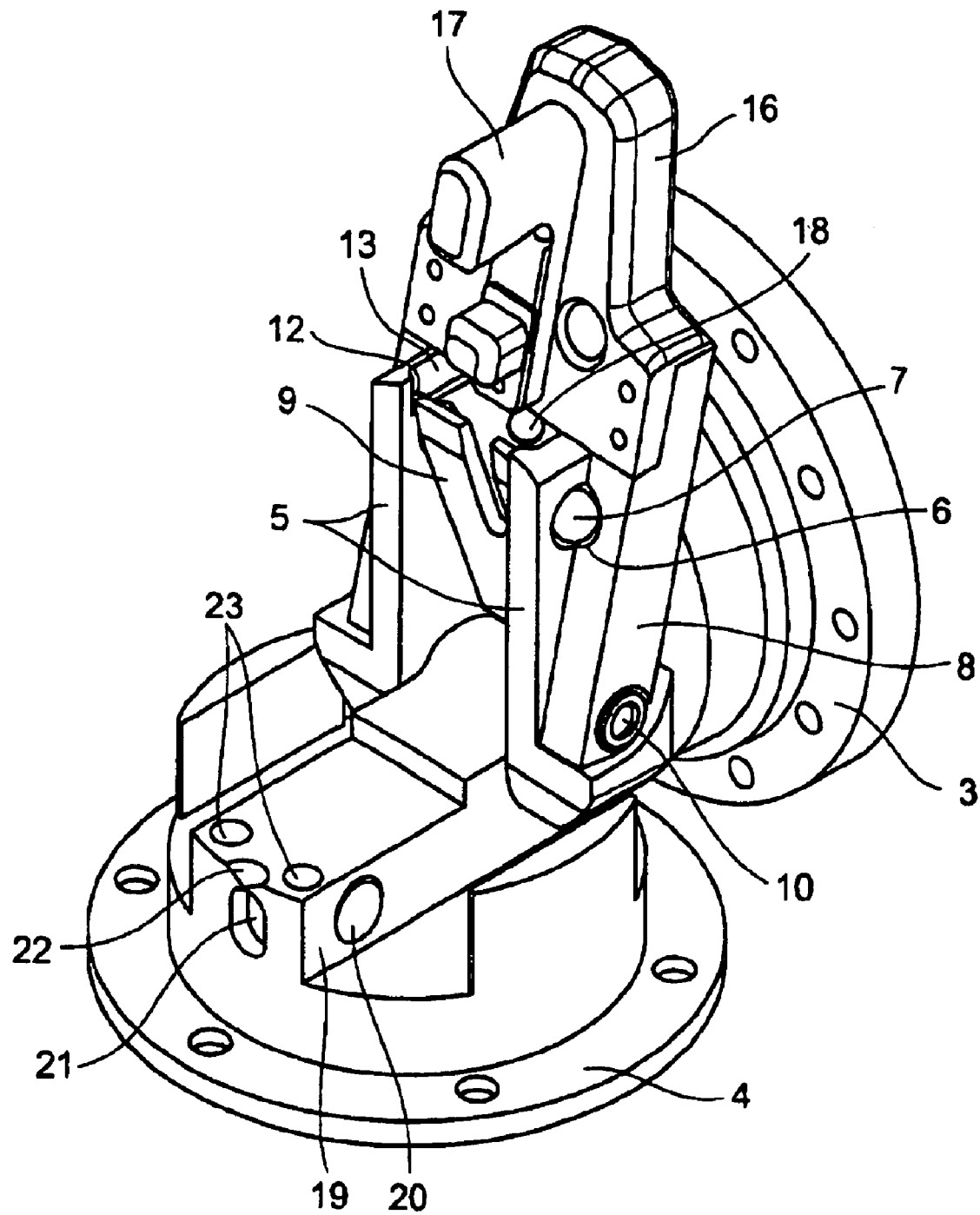
FIG. 2 is an outline perspective view of a tilted state of a steering wheel tilt device according to a first embodiment of the present invention.
Figure 3:
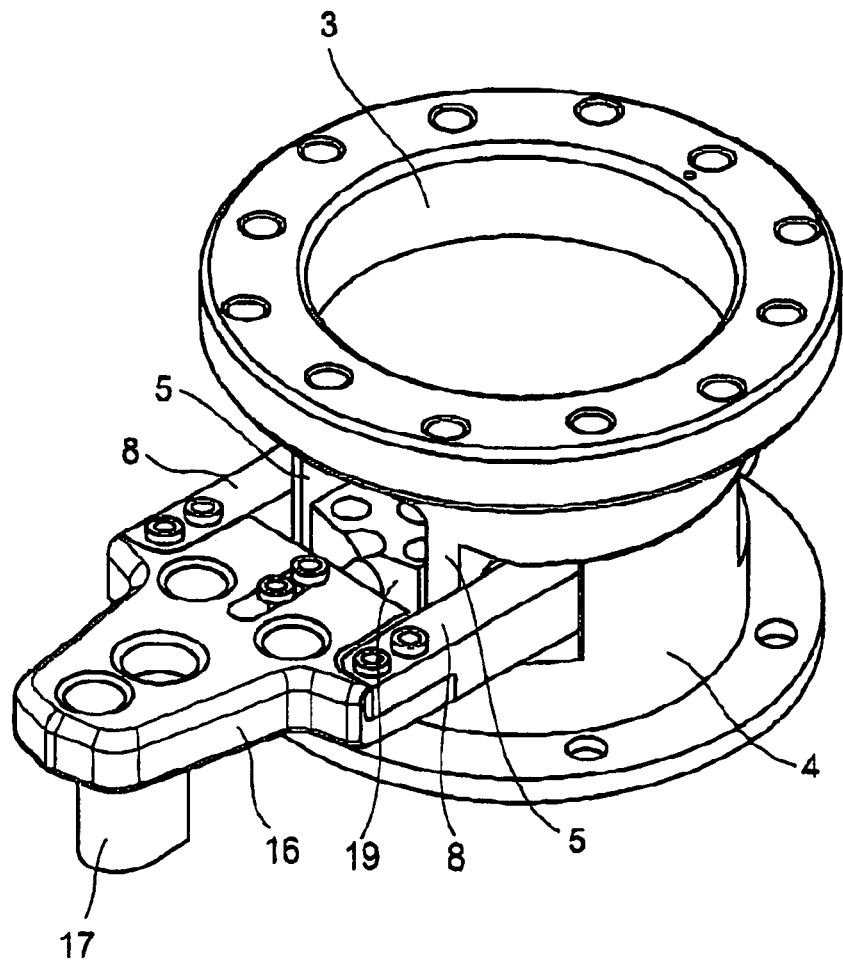
FIG. 3 is an outline perspective view of a fitted state of the steering wheel tilt device according to the first embodiment of the present invention.
Figure 4:
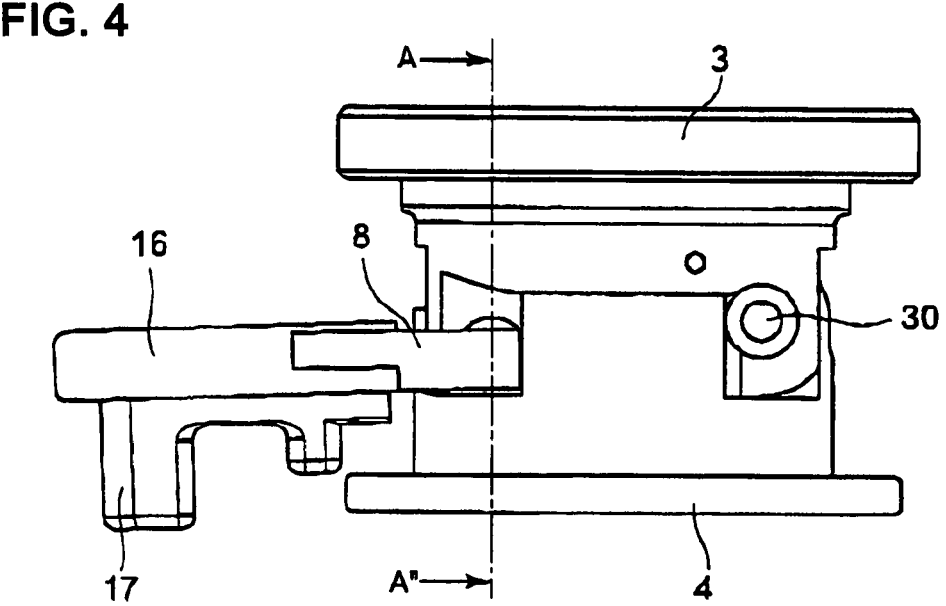
FIG. 4 is a lateral view of the steering wheel tilt device according to the first embodiment of the present invention.
Figure 5:
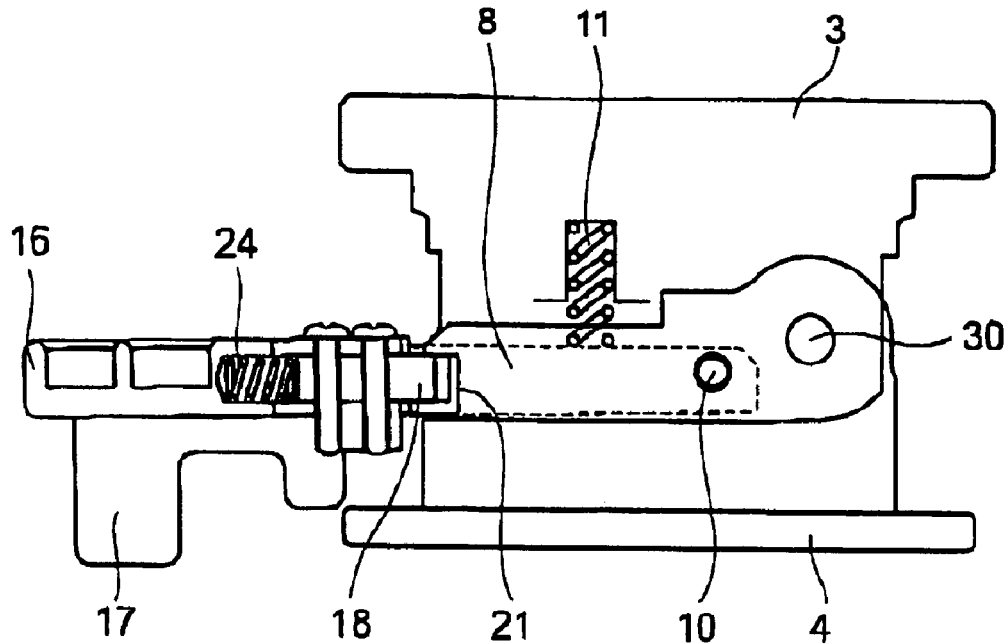
FIG. 5 is a lateral cross-sectional view of the steering wheel tilt device according to the first embodiment of the present invention.
Figure 6:
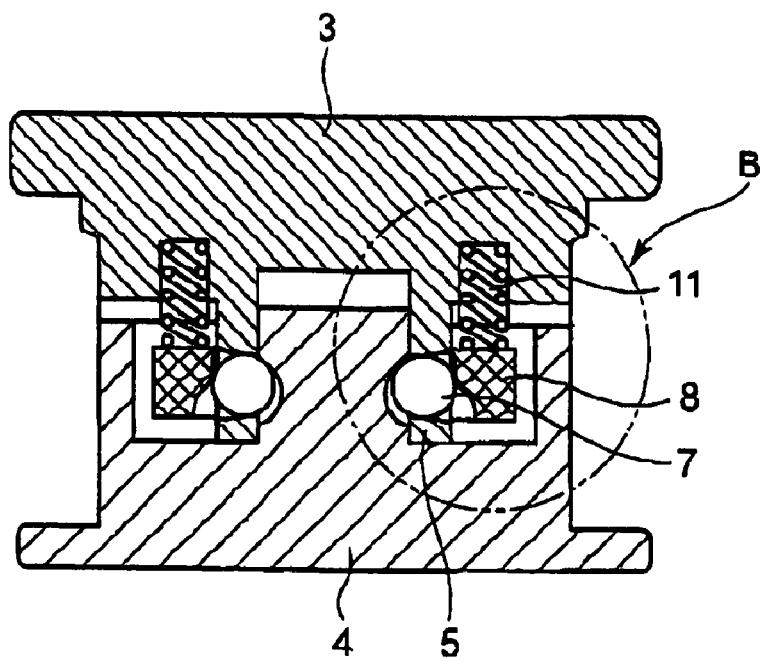
FIG. 6 is a cross-sectional view of the steering wheel tilt device according to the first embodiment of the present invention, taken along a line A-A" of FIG. 4.
Figure 7:
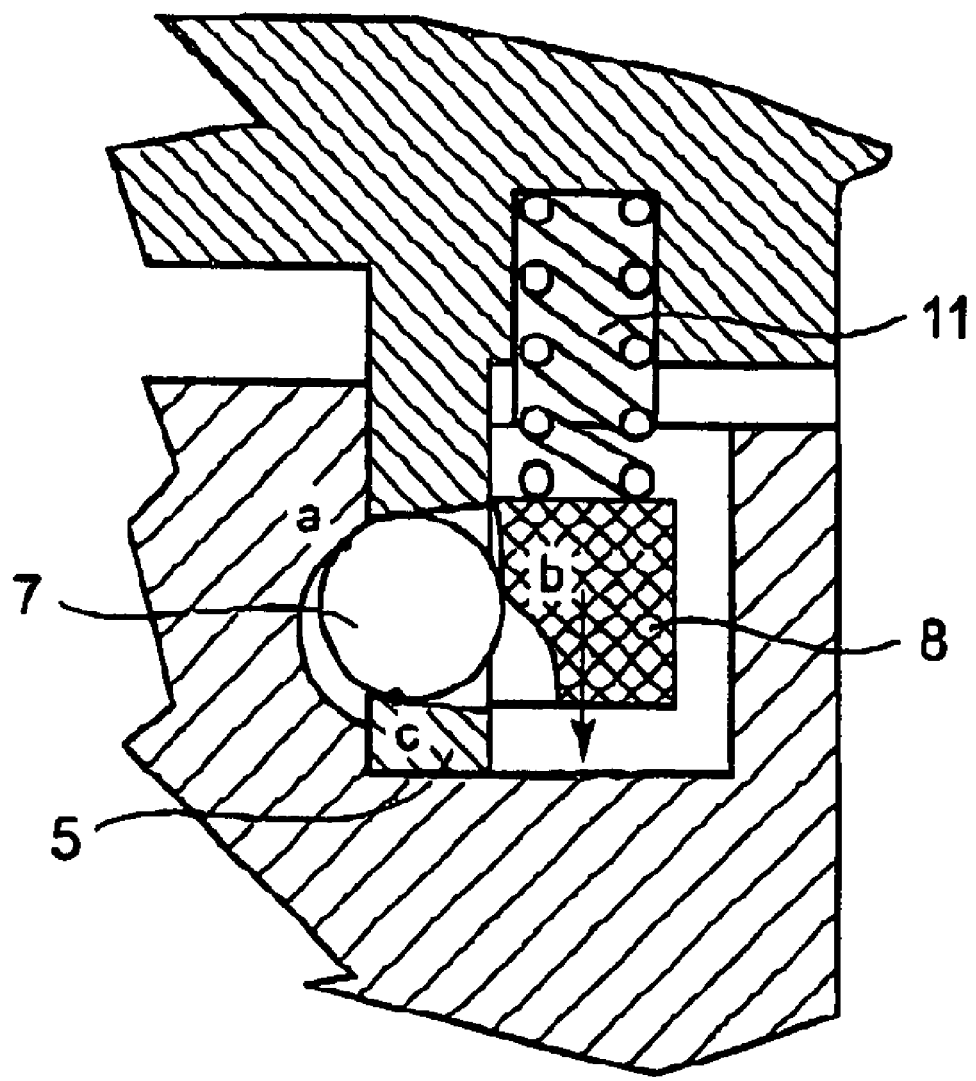
FIG. 7 is an enlarged cross-sectional view of a region B of FIG. 6.
Figure 8A:
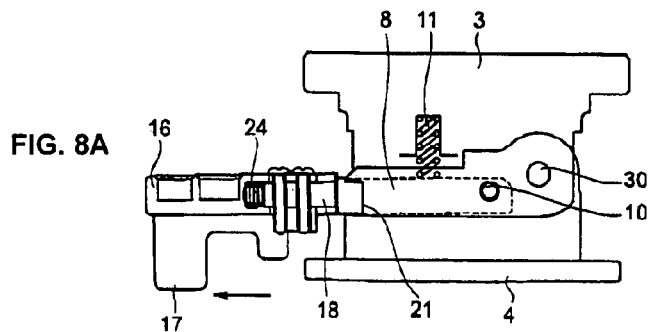
FIGS. 8A to 8E are an operating step views of the steering wheel tilt device from the fitted state thereof to the tilted state thereof, consisting of FIG. 8A as a lateral view of the steering wheel tilt device with a safe trigger pulled, FIG. 8B as a lateral view of the steering wheel tilt device with a lever raised, FIG. 8C as a lateral view of the steering wheel tilt device at the time when a tilting movement thereof is started, FIG. 8D as a lateral view of the steering wheel tilt device at the time when an inner cam starts rotating, and FIG. 8E as a lateral view of the steering wheel tilt device at the time when the inner cam has stopped rotating.
Figure 8B:
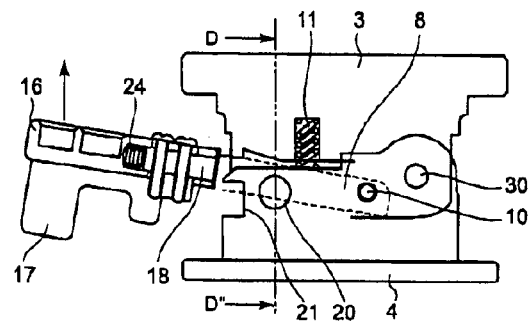
Figure 8C:
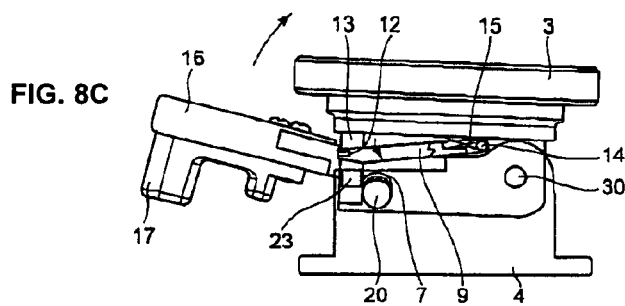
Figure 8D:
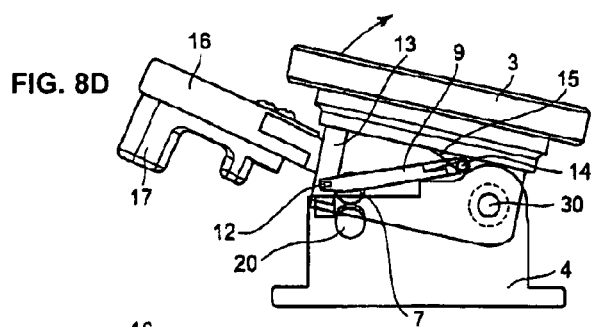
Figure 8E:
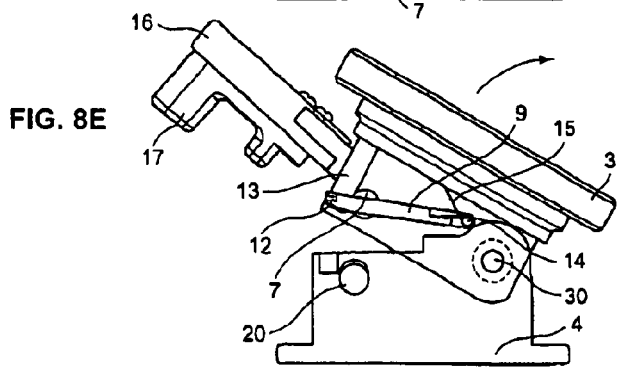
Figure 9:
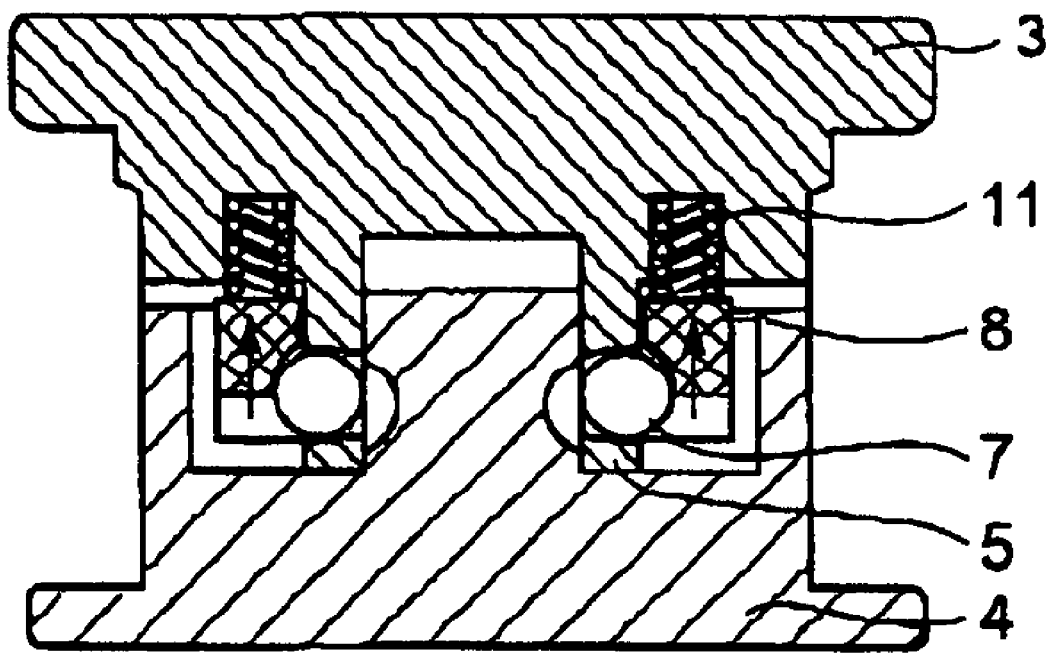
FIG. 9 is a cross-sectional view taken along a line D-D" of FIG. 8B.
Figure 10A:
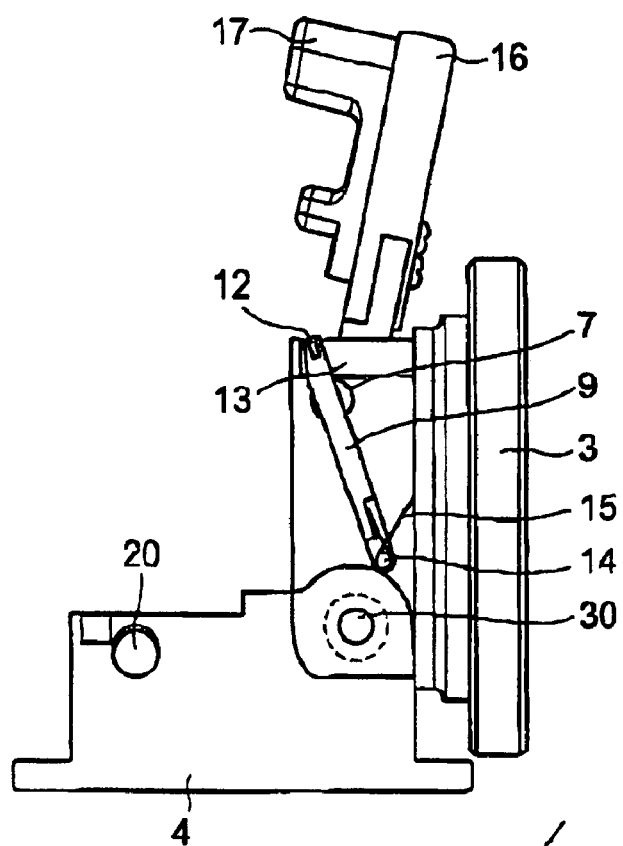
FIGS. 10A to 10C are an operating step views of the steering wheel tilt device from the tilted state thereof to the fitted state thereof, consisting of FIG. 10A as a lateral view of the steering wheel tilt device in the tilted state, FIG. 10B as a lateral view of the steering wheel tilt device at the time when the inner cam is in contact with a projection member, and FIG. 10C as a lateral view of the steering wheel tilt device at the time when a dead pin is in contact with the projection member.
Figure 10B:
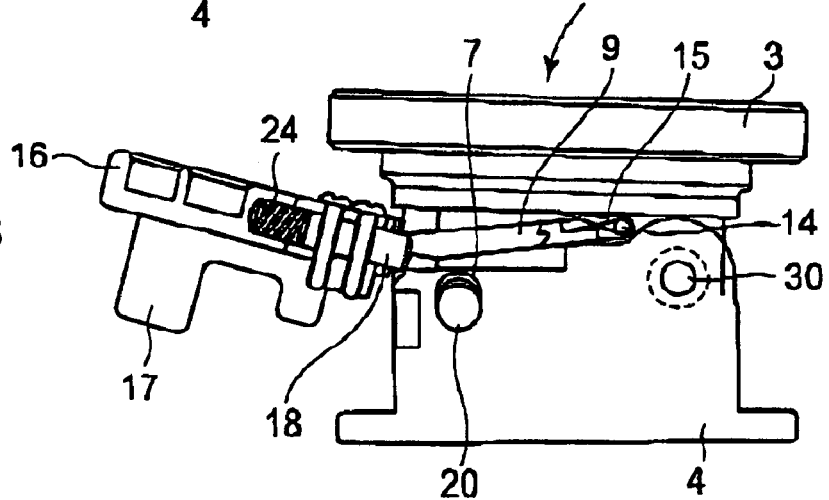
Figure 10C:
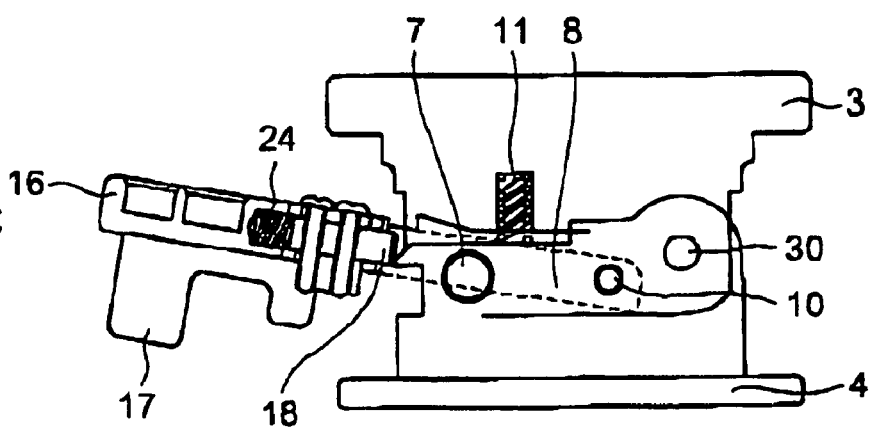
Figure 11:
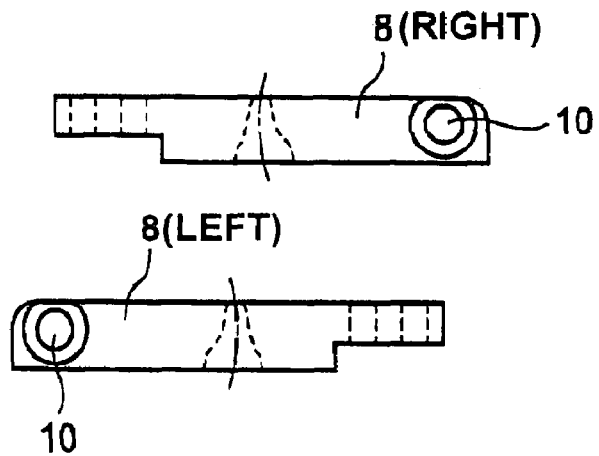
FIG. 11 is a lateral view of sleeve arms as viewed from inside.
Figure 12A:
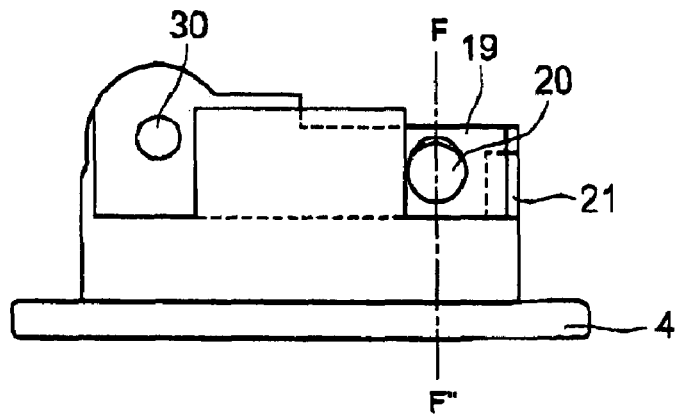
FIGS. 12A and 12B are an enlarged views of the projection member, consisting of FIG. 12A as a lateral view of the projection member and FIG. 12B as a cross-sectional view taken along a line F-F" of FIG. 12A.
Figure 12B:
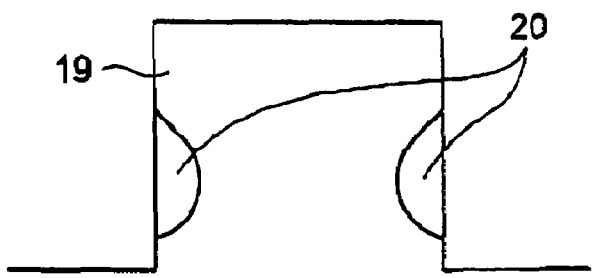

FIGS. 1A to 1C are explanatory views each showing a mode of use of the steering wheel tilt device according to the present invention. FIG. 2 is an outline view of a tilted state of the steering wheel tilt device. FIG. 3 is an outline view of a fitted state of the steering wheel tilt device. FIG. 4 is a lateral view of the steering wheel tilt device. FIG. 5 is a lateral cross-sectional view of the steering wheel tilt device. FIG. 6 is a cross-sectional view taken along a line A-A" of FIG. 4. FIG. 7 is an enlarged view of a region B of FIG. 6. FIGS. 8A to 8E are transitional views of tilt-up operations from a fitted state of the steering wheel tilt device. FIG. 9 is a cross-sectional view taken along a line D-D" of FIG. 8A. FIGS. 10A to 10C are step views of coupling operations from a tilted state of the steering wheel tilt device. FIG. 11 is a lateral view of left and right sleeve arms as viewed from inside. FIG. 12A is a lateral view of a projecting portion. FIG. 12B is a cross-sectional view taken along a line F-F" of FIG. 12A.

First, a basic construction of the steering wheel tilt device according to this embodiment of the present invention is illustrated. FIG. 1A is an exploded perspective view of the steering wheel tilt device. FIG. 1B is a perspective view showing a fitted state of the steering wheel tilt device. FIG. 1C is a perspective view showing a tilted state of the steering wheel tilt device.

The steering wheel tilt device according to this embodiment of the present invention is equipped with a socket 3 and a plug 4 each fitted to a steering wheel 1 and a steering boss 2. The socket 3 and the plug 4 are opened and closed through a hinge movement. In this example, the socket 3 is fitted to the steering wheel 1, and the plug 4 is fitted to the steering/boss 2. For convenience of explanation, it will be assumed hereinafter that a front side represents a side opening through the hinge movement and that a rear side represents a side having a first rotational shaft 30 (see FIGS. 4 and 5) for the hinge movement.

Next, the construction of the steering wheel tilt device according to the present invention will be described with reference to FIGS. 2 and 3 as well.

Figure 16:
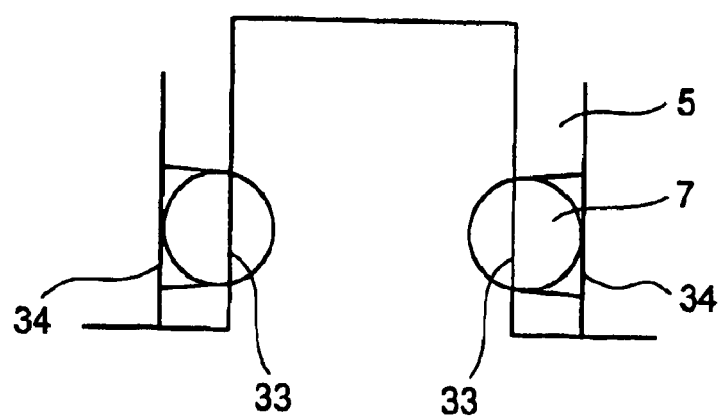
FIG. 16 is an enlarged cross-sectional view of tapered holes of the plate-type projection member according to the first embodiment of the present invention.

The socket 3 is provided with two L-shaped plate-type projection members 5 that are laterally symmetrical to each other. Tapered holes 6 are formed through front portions of the plate-type projection members 5 respectively, and balls 7 are installed in the tapered holes 6 respectively. Small-diameter holes 33 (see FIG. 16) of the tapered holes 6 are smaller in diameter than the balls 7. Thus, the balls 7 are prevented from falling inside. In addition, large-diameter holes 34 (see FIG. 16) of the tapered holes 6 are larger in diameter than the balls 7. A hole through which the first rotational shaft 30 (see FIG. 4) for making a hinge movement passes is formed through a rear portion of each of the plate-type projection members 5. Moreover, sleeve arms 8 are disposed in contact with the plate-type projection members 5 respectively. The sleeve arms 8 rotate around a second rotational shaft 10 with which the plate-type projection members 5 are provided. Furthermore, a lever 16 is connected to ends of the sleeve arms 8. The lever 16 is accompanied with a safety trigger 17, which is provided on the plug 4 side with a dead pin 18 being a safety device. An inner cam 9 is disposed inside the plate-type projection members 5, and inner cam stoppers 12 are provided at ends of the inner cam 9 respectively. In addition, inner cam grooves 13, through which the inner cam stoppers 12 pass respectively, are provided inside the ends of the plate-type projection members 5 respectively. A projection member 19 for engaging the plate-type projection members 5 is disposed on the plug 4. Recess 20 for receiving the balls 7 respectively are formed in the projection member 19 on the left and right thereof respectively. Permanent magnets 23 are provided on a face of the projection member 19 on the socket 3 side. A dead pin canceller dent 22 is provided at a corner between the face of the projection member 19 on the socket 3 side and a front face of the projection member 19. A dead pin hole 21 is formed in the front face of the projection member 19.

Next, the outline of operations of the respective portions will be described.

First, the sleeve arms 8 will be described. The sleeve arms 8, which are laterally disposed in contact with outsides of the plate-type projection members 5 respectively, can make a rotational movement around the second rotational shaft 10. As shown in FIG. 5, the second rotational shaft 10 is located at a position of each of the plate-type projection members 5 which is in front of the first rotational shaft 30 and closer to the plug 4 than the first rotational shaft 30. When the sleeve arms 8 are rotated toward the socket 3 in releasing the socket 3 from the plug 4, the sleeve arms 8 rotate around the second rotational shaft 10. As a result, the socket 3, to which a force is applied, makes a hinge movement around the first rotational shaft 30. When the sleeve arms 8 are rotated toward the plug 4 in fitting the socket 3 to the plug 4, the second rotational shaft 10 is fixed because the sleeve arms 8 are in contact with the balls 7 respectively, and the socket 3 makes a hinge movement around the first rotational shaft 30 together with the sleeve arms 8. The sleeve arms 8 are provided with step portions having recesses such that the balls 7 are partially accommodated therein respectively when the sleeve arms 8 are rotated. The step portions assume a shape shown in FIG. 11. Thus, the balls 7 are accommodated in the recesses in releasing the socket 3 from the plug 4, and move through the step portions to stop at suitable positions in fitting the socket 3 to the plug 4 through rotation.

When the sleeve arms 8 are rotated toward the socket 3, the sleeve arms 8 come into contact with the socket 3 at such positions that even the maximum distance from the circumference of each of the recesses of the sleeve arms 8 to the circumference of each of the large-diameter holes 34 (see FIG. 16) of the tapered holes 6 does not exceed the diameter of the balls 7, and are prevented from rotating any further. Thus, the balls 7 can be prevented from falling respectively from holes that are formed of the large-diameter holes 34 (see FIG. 16) of the tapered holes 6 and the recesses of the sleeve arms 8. When the sleeve arms 8 are rotated toward the plug 4, terminal ends of the sleeve arms 8 on the second rotational shaft 10 side come into contact with the plate-type projection members 5 respectively at such positions that even the maximum distance from an upper portion of each of the sleeve arms 8 to the circumference of each of the large-diameter holes 34 (see FIG. 16) of the tapered holes 6 does not exceed the diameter of the balls 7. Thus, the balls 7 are prevented from falling respectively from the large-diameter holes 34 (see FIG. 16) of the tapered holes 6. In addition, first spring members 11 are disposed between the socket 3 and the sleeve arms 8 respectively as shown in FIG. 5. Each of the first spring members 11 vertically applies to a corresponding one of the sleeves 8 a force urging it to move away from the socket 3.

Next, the inner cam 9, the inner cam stoppers 12, and the inner cam grooves 13 will be described with reference to FIG. 8. The inner cam 9, which assumes the shape of a plate and has the inner cam stoppers 12 at a left end and a right end thereof respectively, is disposed in contact with the insides of the plate-type projection members 5 (see FIG. 2). The plate-type projection members 5 have the inner cam grooves 13 respectively, and the inner cam stoppers 12 move within the inner cam grooves 13 respectively. The inner cam grooves 13 do not extend to ends of the plate-type projection members 5 on the plug 4 side respectively (see FIG. 2). In addition, as shown in FIG. 8C, the inner cam 9 can make a rotational movement around a third rotational shaft 14. The inner cam 9 has second spring members 15 on the third rotational shaft 14, and a force pressing the inner cam 9 toward the plug 4 is applied to the inner cam 9. Furthermore, when the inner cam 9 rotates toward the plug 4, the inner cam stoppers 12 come into contact with terminal ends of the inner cam grooves 13 respectively at such positions that a bottom face of the inner cam 9 exceeds the diameter of the small-diameter holes 33 (see FIG. 16) of the tapered holes 6 and that even the maximum distance from an upper face of the inner cam 9 to the circumference of each of the small-diameter holes 33 (see FIG. 16) of the tapered holes 6 does not exceed the diameter of the balls 7, and are prevented from rotating any further. Thus, even when the inner cam 9 has been lowered to its lowermost position, the balls 7 can be supported from inside. A rear portion of the projection member 19 is elevated than a front portion thereof by one step. When the socket 3 is fitted to the plug 4, the inner cam 9 is stopped in contact with the rear portion of the projection member 19.

Next, the lever 16, the dead pin 18, and the safety trigger 17 will be described. Front ends of the left sleeve arm 8 and the right sleeve arm 8 are connected to the lever 16 (see FIG. 2). As shown in FIG. 8A, the lever 16 is accompanied with the safety trigger 17, which moves backward and forward in a direction perpendicular to the plug 4. The dead pin 18, which is long enough to reach the plug 4 in a state of connection, is connected to a rear end of the safety trigger 17. A third spring member 24 is disposed between the dead pin 18 and the lever 16 to press the safety trigger 17 and the dead pin 18 backward.

Thus, when the third spring member 24 is expanded in fitting the socket 3 to the plug 4, the dead pin 18 reaches the plug 4. When the third spring member 24 is contracted, the dead pin 18 moves away from the plug 4.

Next, the projection member 19 will be described. The projection member 19 is so provided as to enter a space between the plate-type projection members 5 (see FIG. 2). The projection member 19 has in a front-left portion thereof and a front-right portion thereof the ball receiving recesses 20 into which the balls 7 move respectively (see FIG. 2). Thus, the balls 7 are accommodated in the recesses 20 respectively when the socket 3 is fitted to the plug 4. The centers of circles of the recesses 20 are respectively located slightly closer to the plug 4 than centers of the small-diameter holes 33 (see FIG. 16) of the tapered holes 6 at the time when the socket 3 is fitted to the plug 4. In addition, the recesses 20 have been each chipped off with a gentle slope as shown in FIG. 12 toward a surface, in the direction of the socket 3.

The dead pin hole 21 is formed in the front face of the projection member 19 (see FIG. 2). Thus, the dead pin 18 is accommodated in the dead pin hole 21 when the socket 3 is fitted to the plug 4. Furthermore, the projection member 19 has the dead pin canceller dent 22, which has been smoothly chipped off toward a surface thereof from the center of a side on a front face of the projection member 19 on the socket 3 side in the direction of the dead pin hole 21 (see FIG. 2). Thus, the dead pin 18 is smoothly accommodated in the dead pin canceller dent 22. In addition, the permanent magnets 23 are installed on the face of the projection member 19 on the socket 3 side at a front portion thereof.

Next, the construction of this embodiment of the present invention in fitting the socket 3 to the plug 4 will be described.

Referring to FIG. 5, each of the first spring members 11 applies a force acting toward the plug 4 to a corresponding one of the sleeve arms 8 at a position shifted to the left of the second rotational shaft 10 in FIG. 5, so the sleeve arms 8 are urged to rotate around the second rotational shaft 10 toward the plug 4: Thus, inclines shown in FIG. 11, which are provided on the insides of the sleeve arms 8 respectively, thrust the balls 7 into the tapered holes 6 respectively as shown in FIG. 6. The recesses 20 have centers of circular dents which are offset from the centers of the tapered holes 6 respectively toward the plug 4. Therefore, the balls 7, which are pressed by the inclines on the insides of the sleeve arms 8 respectively, come into contact with the recesses 20 at a point a, with the sleeve arms 8 at a point b, and with the tapered holes 6 at a point c as shown in FIG. 7.

Thus, there is generated a large force for bringing the socket 3 and the plug 4 into tight contact with each other, so the socket 3 and the plug 4 are securely fitted to each other. Accordingly, the degree of backlash can be reduced when the socket 3 and the plug 4 are fitted to each other.

Next, the operation of the safety device according to this embodiment of the present invention will be described.

In this embodiment of the present invention, first, each of the first spring members 11 constantly applies a force to the dead pin 18, which is connected to the safety trigger 17, toward the plug 4. Thus, the end of the dead pin 18 is in the dead pin hole 21 formed in the projection member 19. As shown in FIG. 8A, the end of the dead pin 18 comes out of the dead pin hole 21 when the safety trigger 17 is pulled forward. Thus, the lever 16 can be rotated toward the socket 3 as shown in FIG. 8B.

Thus, even when an attempt is made to rotate the lever 16 toward the socket 3, the dead pin 18 serves as a latch and thus prevents the lever 16 from being moved unexpectedly unless the safety trigger 17 is pulled. Accordingly, the steering wheel is prevented from being tilted up unexpectedly while driving or the like, so driving safety is guaranteed.

Next, the tilt-up operation according to this embodiment of the present invention will be described with reference to FIGS. 8A to 8E.

When the lever 16 is pulled up after the safety device has been removed as described above, the sleeve arms 8 connected to the lever 16 also rise as shown in FIG. 9, so there is no pressing force acting from the sleeve arms 8 toward the large-diameter holes 34 of the tapered holes 6. Then, since the tapered holes 6 have a large diameter as to the outer circumferences thereof, the balls 7 move outward. When the balls 7 move outward to reach the height of a top plane of the projection member 19 while moving, the socket 3 and the plug 4 are released from each other. Then, the socket 4 starts making a hinge movement as shown in FIG. 8C. At this moment, the second spring members 15 and the permanent magnets 23 apply a pressing force to the inner cam 9 toward the plug 4, so the inner cam 9 starts rotating around the third rotational shaft 14 toward the plug 4. As shown in FIG. 8D, while the socket 3 increases in gradient, the inner cam 9 also rotates toward the plug 4 and increases in gradient. When the inner cam 9 continues to rotate, the inner cam stoppers 12 come into contact with the terminal ends of the inner cam grooves 13 respectively and stop. At this moment, the balls 7 are held from inside by lateral faces of the inner cam 9. Thus, the balls 7 cannot move inward, so the sleeve arms 8 are in contact with the balls 7 respectively while being held thereby respectively. Accordingly, although the first spring members 11 apply forces to the sleeve arms 8 respectively toward the plug 4, the sleeve arms 8 do not rotate any further toward the plug 4 from a state of contact with the balls 7. When the hinge movement is further continued, the steering wheel 1 can be tilted up to 90° (see FIG. 10A).

Next, the fitting operation according to this embodiment of the present invention will be described with reference to FIGS. 10A to 10C.

First, as shown in FIG. 10B, when the steering wheel 1 to which the socket 3 is fitted is pressed toward the steering boss 2, the socket 3 starts making a hinge movement toward the plug 4, and the inner cam 9 then comes into contact with the face of the projection member 19 on the socket 3 side to be pressed thereby. Therefore, the inner cam 9 rotates around the third rotational shaft 14 toward the socket 3. At this moment, the balls 7 are held from inside by the lateral faces of the inner cam 9 respectively when the steering wheel 1 is tilted. Therefore, the balls 7 are located inside the plate-type projection members 5 respectively without protruding from the small-diameter holes 33 (see FIG. 16) of the tapered holes 6. After the inner cam 9 has started rotating and been released, the balls 7 are held by the lateral faces of the protruding members 19 respectively and thus still do not protrude inward. Accordingly, the hinge movement is not stopped through contact between the balls 7 and the face of the projection member 19 on the socket 3 side. After that, the balls 7, which have been held by the lateral faces of the projection member 19, are guided by gentle inclines of the recesses 20 shown in FIG. 12 on the socket 3 side to enter the recesses 20 respectively (see FIG. 10C). At this moment, the dead pin 18 is pressed by the third spring members 24 to protrude and thus come into contact with the projection member 19. When the end of the dead pin 18 comes into contact with the dead pin canceller dent 22 at the center of the front of the projection member 19, the dead pin 18 is thrust forward along the slope of the dead pin canceller dent 22 due to inclination thereof. Upon reaching the dead pin hole 21, the dead pin 18 enters the dead pin hole 21.

Second Embodiment

Figure 13A:
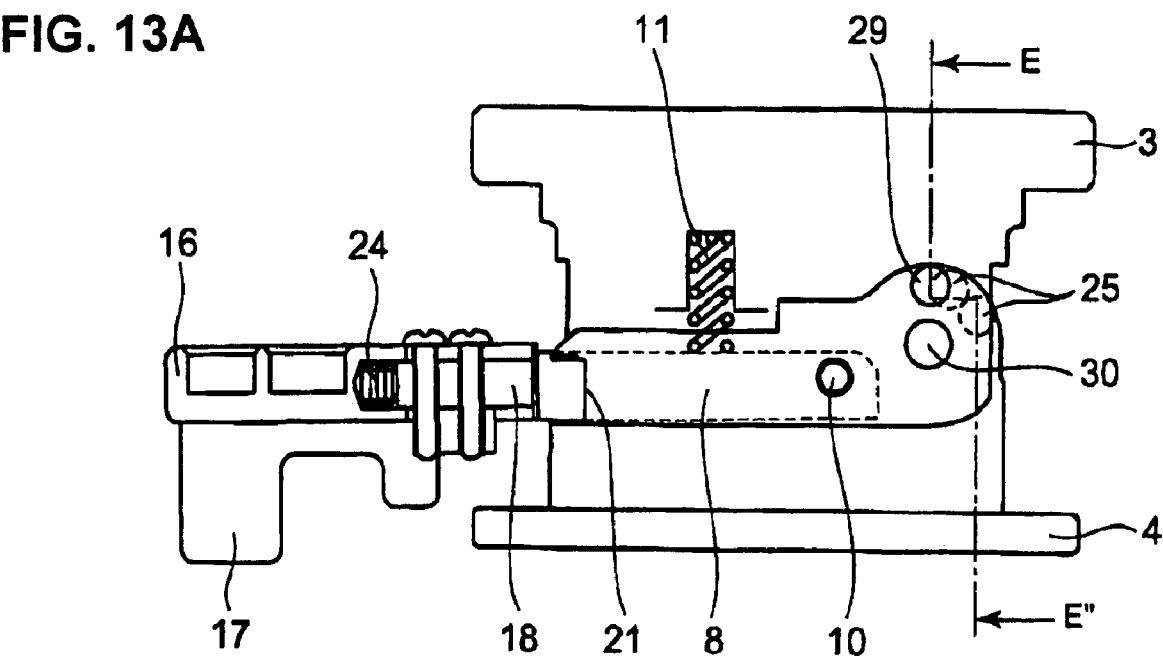
FIGS. 13A and 13B show a steering wheel tilt device according to a sixth embodiment of the present invention respectively, consisting of FIG. 13A as a lateral cross-sectional view of the steering wheel tilt device and FIG. 13B as a cross-sectional view taken along a line E-E" of FIG. 13A.
Figure 13B:
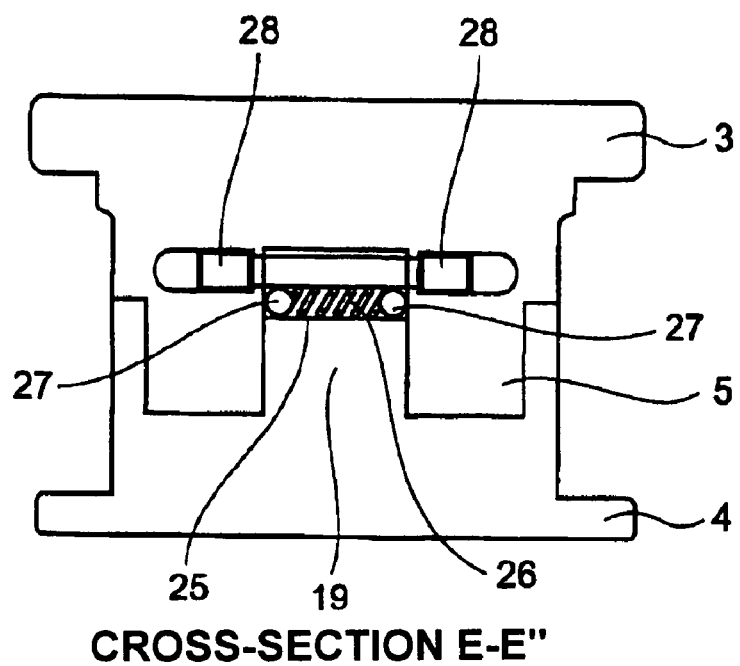

A steering wheel tilt device according to the second embodiment of the present invention will be described with reference to FIGS. 13A and 13B. FIG. 13A is a lateral cross-sectional view in this embodiment of the present invention. Referring to FIG. 13A, in the vicinity of the first rotational shaft 30, a hole 29 and two through-holes 25 are arranged on the socket 3 side and the plug 4 side respectively. FIG. 13B is a cross-sectional view taken along a line E-E". Referring to FIG. 13B, grub screws 28 are in the hole 29. Balls 27 for giving resistance to rotation and a coil 26 are disposed in the through-hole 25. The steering wheel tilt device according to the second embodiment of the present invention is obtained by providing the steering wheel tilt device according to the first embodiment of the present invention with a construction for stopping the socket 3 in its open state at an arbitrary position desired by an operator.

First, the through-holes 25 are opened in the projection member 19 in the vicinity of the first rotational shaft 30 in making a hinge movement, and the balls 27, which are slightly smaller in diameter than the through-holes 25, are so placed in the through-holes 25 as to sandwich the coil spring 26. Subsequently, the hole 29 is opened in each of the plate-type projection members 5 at such a portion as is located on the same circumference as a locus passed by the through-holes 25 in making the hinge movement. The grub screws 28, whose ends are designed as dent ends, are disposed in the hole 29 in contact with the inside of the projection member 19. The dent of each grub screw 28 has a diameter smaller than that of each ball 27 or a depth smaller than the radius thereof.

Thus, when an angle which the socket 3 forms with the plug 4 corresponds to an angle that the hole 29 coincides in position with each of the through-holes 25, the balls 27 are accommodated in the dents of the grub screws 28 respectively and thereby offer increased resistance. Accordingly, the socket 3 can be stopped at that angle. In this embodiment of the present invention, the two through-holes 25 are formed through the projection member 19, and the balls 27 are accommodated in the two dents of the grub screws 28 respectively, so a two-stage movement is realized. However, if the grub screws 28 are adjusted, the balls 27 are also accommodated in steps created between tapered portions of the tips of the grub screws 28 and inner diameter portions of female screws respectively. Therefore, an increase in resistance is achieved at that angle as well, and the socket 3 can be stopped at that angle as well. Alternatively, it is also appropriate to provide the single through-hole 25. In addition, the number of the through-holes 25 can be increased to a suitable number as long as they are confined within an angular range of 90° or less.

In this embodiment of the present invention, the number of stop positions of the socket 3 is adjusted by changing the number of the through-holes 25. However, the number of the stop positions of the socket 3 can also be adjusted by changing the number of holes 29.

Third Embodiment

A steering wheel tilt device according to the third embodiment of the present invention is obtained by providing the steering wheel tilt device according to the first embodiment of the present invention with a construction for removing the socket 3 from the plug 4.

A bolt is used as the center of the first rotational shaft 30 when the socket 3 and the plug 4 make a hinge movement. In this embodiment of the present invention, a projecting portion is cut open outward in a hole for supporting the bolt. Thus, the socket 3 can be removed from the plug 4 after the steering wheel 1 has been tilted up.

Fourth Embodiment

A steering wheel tilt device according to the fourth embodiment of the present invention is obtained by modifying the steering wheel tilt device according to the first embodiment of the present invention such that the lateral faces of the projection member 19 are tapered instead of being made perpendicular to a bottom face thereof.

In this embodiment of the present invention, the projection member 19 is thinner on the socket 3 side than on the plug 4 side, and thus likely to pass between the plate-type projection members 5. Thus, even if the projection member 19 is made on the plug 4 side just as wide as the plate-type projection members 5, the plate-type projection members 5 do not hit the face of the projection member 19 on the socket 3 side. As a result, the projection member 19 and the plate-type projection members 5 can be coupled together tightly. Accordingly, the degree of tightness between the plate-type projection members 5 and the projection member 19 on the plug 4 side is increased, so they can be firmly coupled together.

Fifth Embodiment

A steering wheel tilt device according to the fifth embodiment of the present invention is obtained by modifying the steering wheel tilt device according to the first embodiment of the present invention such that the plate-type projection members 5, the tapered holes 6 and the recesses 20 that are located on the left and right of the projection member 19, and the balls 7 on the left and right are arranged laterally asymmetrically.

In this embodiment of the present invention, interference points of the respective members for preventing the creation of backlash at the time of coupling are laterally asymmetrical to each other. Given this assumption, any four points do not exist on a same plane, so there is no inclination toward movement for a force applied in any specific direction. In consequence, the degree of backlash can further be reduced.

Sixth Embodiment

Figure 14:
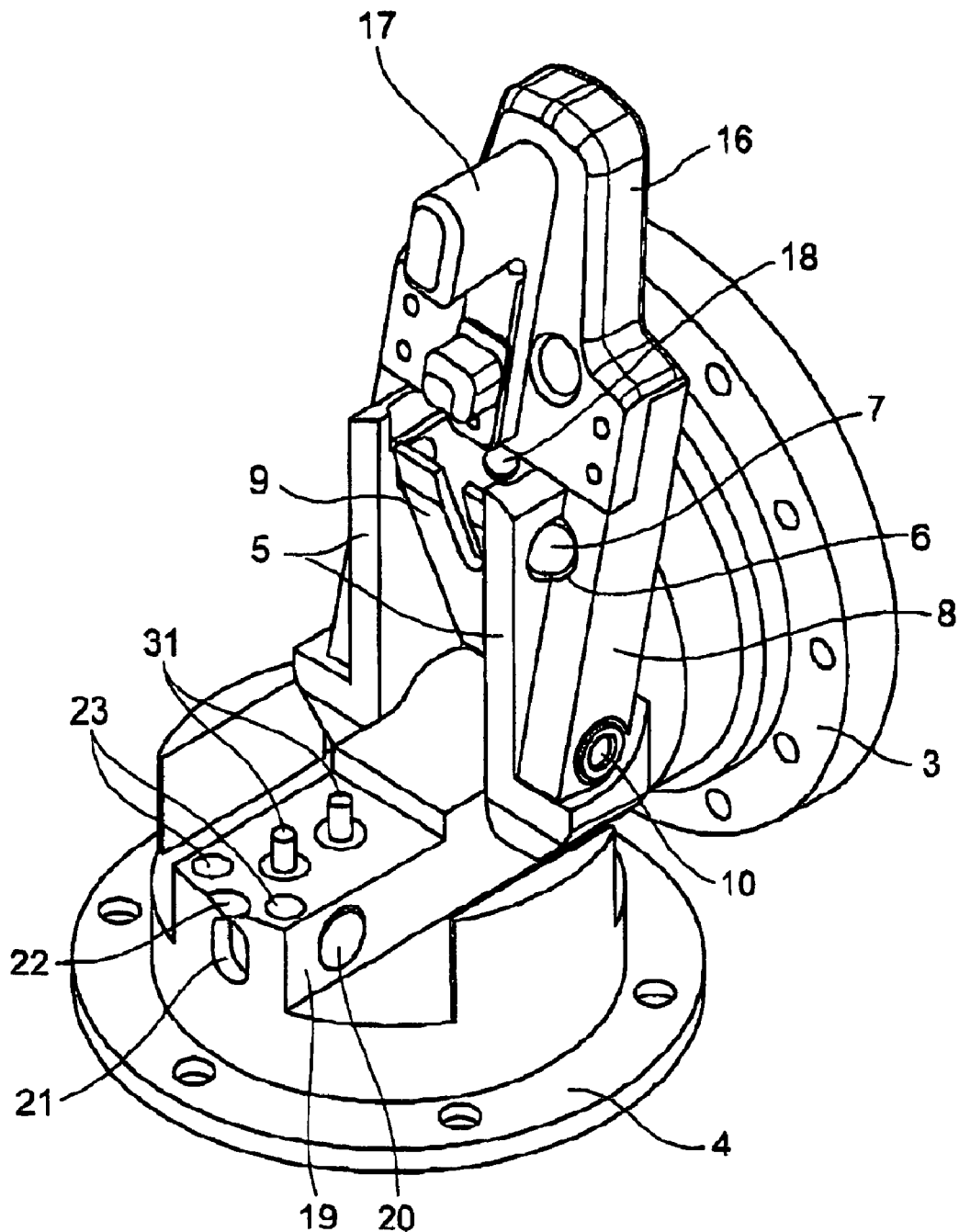
FIG. 14 is an outline perspective view of a tilted state of the steering wheel tilt device according to the sixth embodiment of the present invention.
Figure 15:
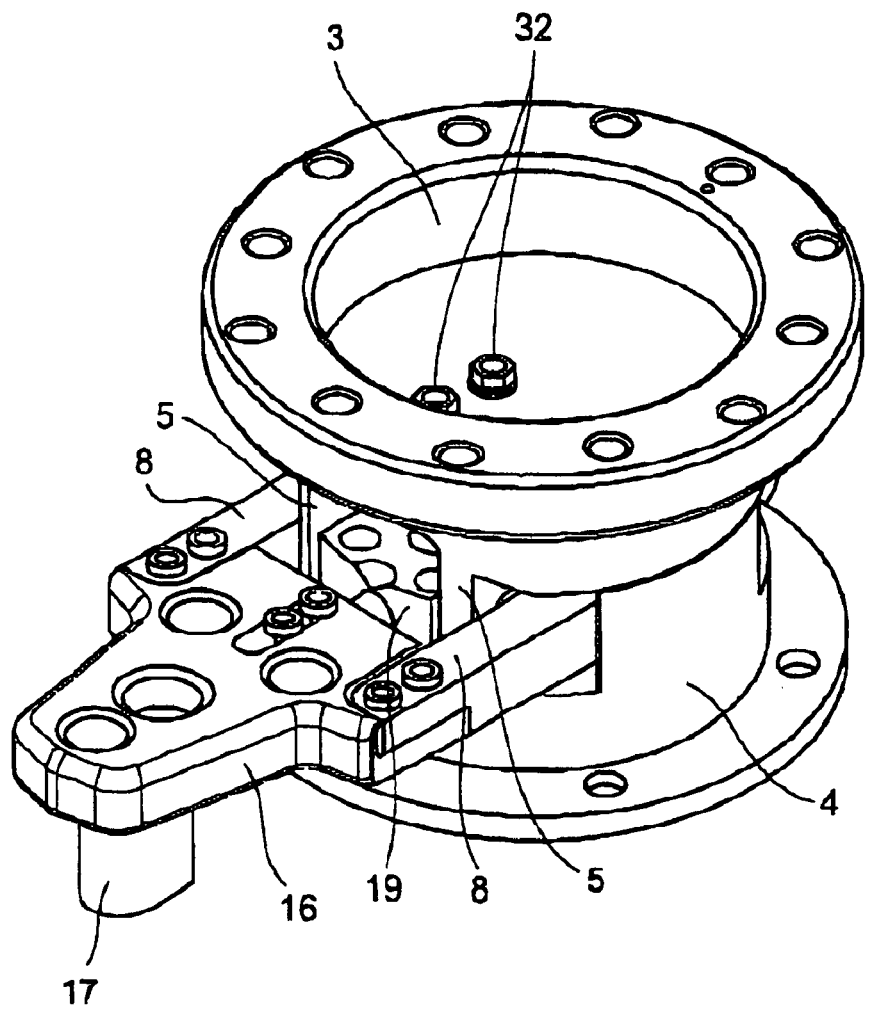
FIG. 15 is an outline perspective view of a fitted state of the steering wheel tilt device according to the sixth embodiment of the present invention.

A steering wheel tilt device according to the sixth embodiment of the present invention will be described with reference to FIGS. 14 and 15. The steering wheel tilt device according to the sixth embodiment of the present invention is obtained by modifying the steering wheel tilt device according to the first embodiment of the present invention such that the inner cam 9 has a recess extending from a front portion thereof to a rear portion thereof, electrodes 31 are so installed as to pass through the recess when the inner cam 9 is coupled to the projection member 19, and terminals 32 are arranged to come into contact with the electrodes 31 respectively when the plug 4 is coupled to the socket 3.

Thus, even when components of an electric system are installed on the steering wheel 1 and the steering boss 2, cables of the electric system do not cause any hindrance during a hinge movement. There is no risk of the cables being cut off either.

What is claimed is:

1. A steering wheel tilt device comprising:
   a socket having a back face to which one of a steering wheel and a steering boss is mounted;

a plug having a back face to which the other of the steering wheel and the steering boss is mounted, for being fitted to the socket;

a first rotational shaft for pivoting the socket at one end thereof and the plug at the other end thereof to realize the fitted state or a released state of the socket and the plug;

a second rotational shaft extending parallel to the first rotational shaft in a vicinity of an inside of the first rotational shaft on the socket side;

a sleeve arm having one end pivoted on the second rotational shaft and the other end located in a direction perpendicular to the second rotational shaft, for realizing the fitted state or the released state of the socket and the plug through a rotational movement of the other end;

a plate-type projection member with a predetermined thickness, which projects in such a direction as to face the plug and is provided on the socket such that one face thereof is in contact with the sleeve arm and parallel thereto;

a projection member provided on the plug side in contact with the other face side of the plate-type projection member in the fitted state of the socket and the plug;

a tapered hole for movably accommodating a ball from the one face side of the plate-type projection member to the other face side thereof, the tapered hole being composed of a large-diameter hole located on the one face side and having a larger diameter than the ball and a small-diameter hole located on the other face side and having a smaller diameter than the ball;

a first spring member provided between the sleeve arm and the socket, for pressing the ball toward the small-diameter hole to prevent the part of the sleeve arm from protruding from the large-diameter hole when the one end of the sleeve arm has been rotationally moved toward the plug to realize the fitted state of the socket and the plug; and a recess provided on the projection member side, for receiving a part of the ball protruding from the small-diameter hole, wherein the ball is held fixed at three points, namely, by a part of the recess, a part of the tapered hole, and a part of the sleeve arm.

2. A steering wheel tilt device according to claim 1, wherein:

the sleeve arm comprises a step portion having a recess for accommodating part of the ball in a vicinity of a position of the large-diameter hole; and the sleeve arm is pressed by a pressing force of the first spring member at an angle immediately before entrance of the ball into the step portion, when the one end of the sleeve arm is rotationally moved toward the plug to realize the fitted state of the socket and the plug.

3. A steering wheel tilt device according to claim 2, further comprising a plate-type inner cam that is pivoted at one end thereof by a third rotational shaft provided in a vicinity of the second rotational shaft parallel thereto, supported by a second spring member between the inner cam and the socket, and in contact with the other face of the plate-type projection member in parallel therewith, wherein:

the inner cam thrusts the ball into the large-diameter hole to prevent a part thereof from protruding from the small-diameter hole in the other face, and then the step portion of the sleeve arm holds the ball to prevent the ball from falling out of the large-diameter hole, when the socket and the plug are in the released state; and the inner cam hits a end of the projection member of the plug, stops moving, and shifts from a position of the small-diameter hole in the other face when the one end of the sleeve arm is rotationally moved toward the plug to realize the fitted state of the socket and the plug, so a part of the ball in the small-diameter hole falls into the recess on the projection member side.

4. A steering wheel tilt device according to claim 3, wherein:

the sleeve arm is provided, at one end on a rotational side thereof, with a lever;

the lever has a safety trigger for moving backward and forward in a direction of the plug;

the safety trigger is provided, at an end thereof in the direction of the plug, with a dead pin extending to the projection member;

the lever and the dead pin have a third spring member disposed therebetween;

the projection member is provided with a dead pin hole for allowing entrance of the dead pin; and the dead pin is pressed by the third spring member to enter the dead pin hole when the socket and the plug are fitted to each other.

* * * * *